United States Patent
Oishi et al.

(10) Patent No.: US 12,085,655 B2
(45) Date of Patent: Sep. 10, 2024

(54) CONTROL DEVICE AND STORAGE MEDIUM

(71) Applicant: KABUSHIKI KAISHA TOKAI RIKA DENKI SEISAKUSHO, Aichi (JP)

(72) Inventors: Yoshiki Oishi, Aichi (JP); Kenichi Koga, Aichi (JP); Tatsuya Koike, Aichi (JP); Satoshi Mori, Aichi (JP); Kento Kataoka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 261 days.

(21) Appl. No.: 17/545,365

(22) Filed: Dec. 8, 2021

(65) Prior Publication Data

US 2022/0244339 A1 Aug. 4, 2022

(30) Foreign Application Priority Data

Feb. 4, 2021 (JP) .................................. 2021-016198

(51) Int. Cl.
*G01S 3/02* (2006.01)
*G01S 3/46* (2006.01)
*H04B 1/7163* (2011.01)

(52) U.S. Cl.
CPC ................ *G01S 3/023* (2013.01); *G01S 3/46* (2013.01); *H04B 1/7163* (2013.01)

(58) Field of Classification Search
CPC .......... G01S 3/023; G01S 3/46; G01S 13/765; G01S 13/876; G01S 3/043; G01S 5/0218; G01S 5/0284; G01S 5/12; H04B 1/7163
(Continued)

(56) References Cited

U.S. PATENT DOCUMENTS

2011/0176523 A1* 7/2011 Huang ...................... G01S 5/02
455/456.1
2021/0026347 A1* 1/2021 Nakashima .......... G05D 1/0016
(Continued)

FOREIGN PATENT DOCUMENTS

JP 2010-060457 3/2010
JP 2015-209707 11/2015
(Continued)

*Primary Examiner* — Hirdepal Singh
(74) *Attorney, Agent, or Firm* — GREENBLUM & BERNSTEIN, P.L.C.

(57) ABSTRACT

To provide a novel and improved control device and storage medium capable of performing control based on a positional relation with higher accuracy.

A control device includes a control unit configured to perform control based on a presence area of a first communication device determined using a signal transmitted and received between the first communication device and at least one second communication device. The control unit performs control related to an operation of a controlled device in accordance with a second presence area when a first presence area determined based on a coordinate position of the first communication device on an arbitrary coordinate system associating the first communication device with the second communication device is inconsistent with the second presence area determined based on a distance between the first and second communication devices.

11 Claims, 6 Drawing Sheets

(58) Field of Classification Search
USPC .................................................... 455/456.1
See application file for complete search history.

(56) References Cited

U.S. PATENT DOCUMENTS

| | | |
|---|---|---|
| 2021/0358236 A1 | 11/2021 | Sekiya et al. |
| 2022/0043101 A1* | 2/2022 | Sanji ..................... H01Q 9/42 |
| 2022/0057475 A1* | 2/2022 | Nakashima ............... G01S 5/10 |
| 2023/0016818 A1* | 1/2023 | Saiki .................. H04W 64/006 |

FOREIGN PATENT DOCUMENTS

| | | |
|---|---|---|
| JP | 2020-122727 | 8/2020 |
| WO | 2015/176776 | 11/2015 |

* cited by examiner

CONTROL DEVICE AND STORAGE MEDIUM

CROSS REFERENCE TO RELATED APPLICATION(S)

This application is based upon and claims benefit of priority from Japanese Patent Application No. 2021-016198, filed on Feb. 4, 2021, the entire contents of which are incorporated herein by reference.

BACKGROUND

The present invention relates to a control device and a storage medium.

In recent years, technologies for causing one device to estimate positions of other devices in accordance with results obtained by transmitting and receiving signals between the devices have been developed. For example, PCT International Publication No. WO 2015/176776 discloses a technology for causing an ultra-wideband (UWB) receiver to estimate a positional relation in a UWB transmitter using a UWB signal.

SUMMARY

In the foregoing system, there is a possibility of an estimation result of the positional relation being affected by a multi-path environment.

Accordingly, the present invention has been devised in view of the foregoing problem and an objective of the present invention is to provide a novel and improved control device and storage medium capable of performing control based on a positional relation with higher accuracy.

To solve the foregoing problem, according to an aspect of the present invention, there is provided a control device including a control unit configured to perform control based on a presence area of a first communication device determined using a signal transmitted and received between the first communication device and at least one second communication device. The control unit performs control related to an operation of a controlled device in accordance with a second presence area when a first presence area determined based on a coordinate position of the first communication device in an arbitrary coordinate system associating the first communication device with the second communication device is inconsistent with the second presence area determined based on a distance between the first and second communication devices.

To solve the foregoing problem, according to another aspect of the present invention, there is provided a control device including a control unit configured to perform control based on a presence area of a first communication device determined using a signal transmitted and received between the first communication device and at least one second communication device. The control unit does not perform control related to a predetermined operation of a controlled device when a first presence area determined based on a coordinate position of the first communication device in a coordinate system associating the first communication device with a second communication device is inconsistent with a second presence area determined based on a distance between the first and second communication devices.

To solve the foregoing problem, according to still another aspect of the present invention, there is provided a computer-readable non-transitory storage medium that stores a program causing a computer to implement a control function of performing control based on a presence area of a first communication device determined using a signal transmitted and received between the first communication device and at least one second communication device. Control related to an operation of a controlled device is performed in accordance with a second presence area when a first presence area determined based on a coordinate position of the first communication device in an arbitrary coordinate system associating the first communication device with the second communication device is inconsistent with the second presence area determined based on a distance between the first and second communication devices.

According to the above-described aspects of the present invention, it is possible to perform control based on a positional relation with higher accuracy.

DETAILED DESCRIPTION OF THE EMBODIMENTS

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1 Exemplary System Configuration

Figure 1:
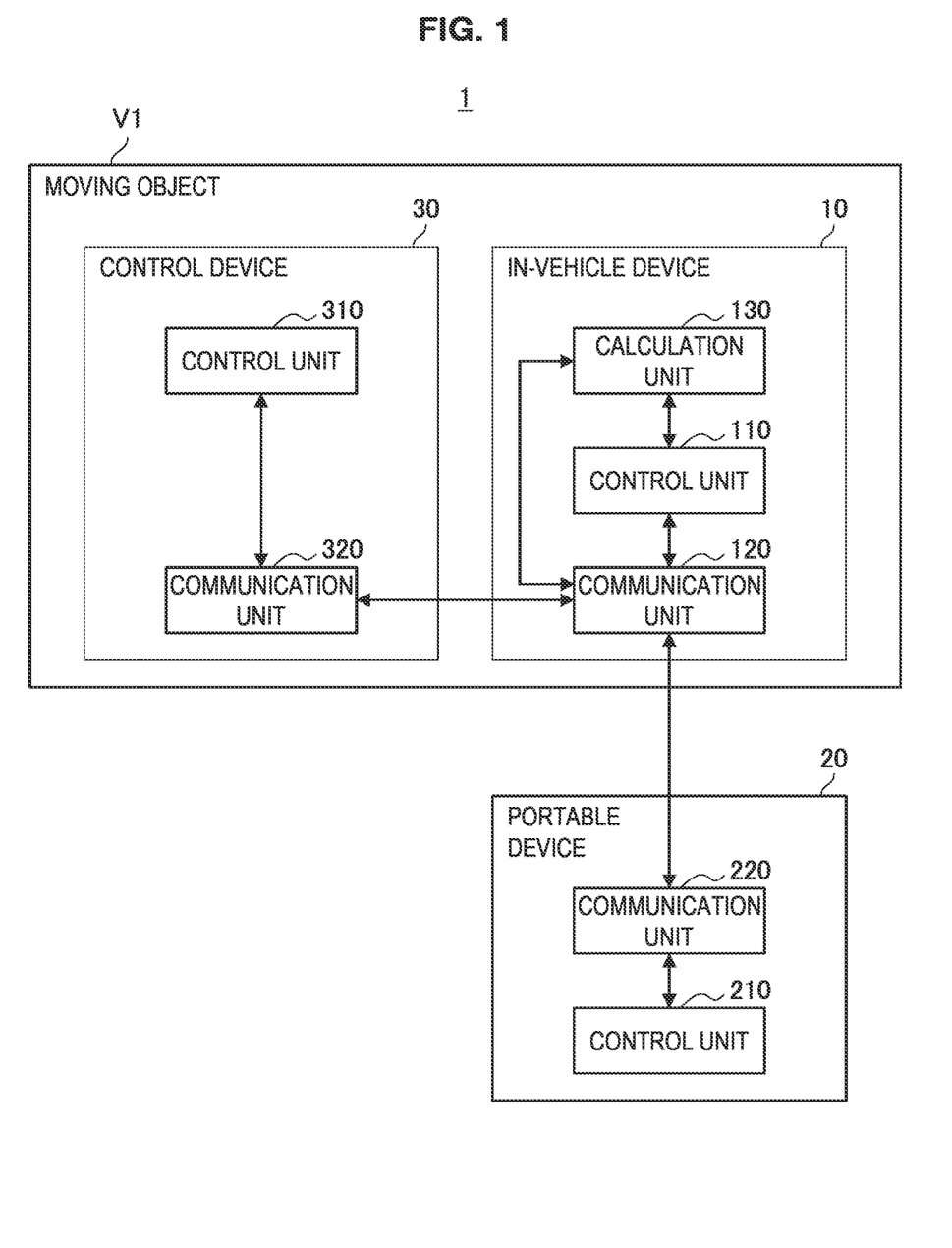
FIG. 1 is a block diagram illustrating an exemplary configuration of a system 1 according to an embodiment.

First, an overall configuration of a system 1 according to an embodiment will be described with reference to FIG. 1. FIG. 1 is a block diagram illustrating an exemplary configuration of the system 1 according to an embodiment.

As illustrated in FIG. 1, the system 1 according to the embodiment includes a moving object V1 and a portable device 20. The moving object V1 includes an in-vehicle device 10 and a control device 30.

The moving object V1 according to the embodiment may be, for example, a vehicle which a user is permitted to board (for example, a vehicle owned by the user or a vehicle lent temporarily to the user) or may be an airplane, a ship, or the like. In the following description, the moving object V1 is assumed to be a vehicle as a main example.

In-Vehicle Device 10

The in-vehicle device 10 according to the embodiment is an example of a second communication device according to the present invention. The in-vehicle device 10 according to the embodiment may be, for example, a communication unit mounted in a vehicle which the user is permitted to board.

One in-vehicle device 10 according to the embodiment may be mounted in a vehicle which the user is permitted to board or a plurality of in-vehicle devices 10 may be mounted in the vehicle.

As illustrated in FIG. 1, the in-vehicle device 10 according to the embodiment includes a control unit 110, a communication unit 120, and a calculation unit 130.

The control unit 110 controls a general operation in the in-vehicle device 10. For example, the control unit 110 controls transmission and reception of wireless signals in conformity with a specific communication standard through an antenna. The specific communication standard includes, for example, an ultra-wideband signal (hereinafter referred to as a UWB signal).

Functions of the control unit 110 according to the embodiment are implemented by, for example, various processors.

The communication unit 120 transmits and receives wireless signals in conformity with a specific communication standard through an antenna under the control of the control unit 110. For example, the communication unit 120 receives a Poll (polling) signal from a communication unit 220 included in the portable device 20. The communication unit 120 transmits a Resp (response) signal as a reply to the Poll signal to the communication unit 220. The communication unit 120 receives a Final signal transmitted from the communication unit 220 as a reply to the Resp signal.

The calculation unit 130 performs a calculation operation of estimating a positional relation between the in-vehicle device 10 and the portable device 20 based on signals transmitted and received between the in-vehicle device 10 and the portable device 20. For example, the calculation unit 130 may perform a calculation operation of estimating an arrival angle of a received signal based on the signal. The calculation unit 130 may perform a calculation operation of estimating a distance between the in-vehicle device 10 and the portable device 20 based on transmitted and received signals. The calculation unit 130 may perform a calculation operation of estimating a 3-dimensional position of the portable device 20 based on an estimated arrival angle of a signal and a distance between the in-vehicle device 10 and the portable device 20.

The calculation unit 130 may determine a presence area of the portable device 20 based on the 3-dimensional position of the portable device 20. A specific example of the presence area will be described below.

Portable Device 20

The portable device 20 according to the embodiment is an example of a first communication device according to the present invention. The portable device 20 according to the embodiment may be, for example, a smartphone, an electronic key, or a wearable terminal.

The in-vehicle device 10 according to the embodiment is carried by, for example, a user and performs transmission and reception of wireless communication in conformity with specific communication with the in-vehicle device 10 mounted in a moving object such as a vehicle used by the user.

As illustrated in FIG. 1, the portable device 20 according to the embodiment includes a control unit 210 and the communication unit 220.

The control unit 210 controls a general operation in the portable device 20. For example, the control unit 210 controls transmission and reception of wireless signals in conformity with a specific communication standard.

Functions of the control unit 210 according to the embodiment are implemented by, for example, various processors.

The communication unit 220 transmits and receives wireless signals in conformity with a specific communication standard through an antenna under the control of the control unit 210.

The communication unit 220 transmits, for example, a Poll signal to the communication unit 120 included in the in-vehicle device 10. The communication unit 220 receives a Resp signal transmitted from the communication unit 120 as a reply to the Poll signal. The communication unit 220 transmits a Final signal as a reply to the Resp signal to the communication unit 120.

The portable device 20 may have a configuration that has a function of the calculation unit 130 included in the in-vehicle device 10. In this case, various calculation operations performed by the calculation unit 130 may be performed by the portable device 20.

Control Device 30

The control device 30 according to the embodiment is an example of a control device according to the present invention and performs control based on a presence area of the portable device 20 where signals transmitted and received between the in-vehicle device 10 and the portable device 20 are estimated to be used on a controlled device mounted in the moving object V1. Hereinafter, an exemplary configuration of the control device 30 according to the embodiment will be described.

1.2 Exemplary Configuration of Control Device 30 According to Embodiment

As illustrated in FIG. 1, the control device 30 includes, for example, a communication unit 310 and a control unit 320.

The communication unit 310 receives various calculation results calculated by the calculation unit 130 included in the in-vehicle device 10. The communication unit 310 may directly receive various calculation results from the communication unit 120 included in the in-vehicle device 10 or may receive various calculation results from the communication unit 220 included in the portable device 20 via the portable device 20.

When a first presence area estimated based on a coordinate position of the portable device 20 in any coordinate system in which the in-vehicle device 10 and the portable device 20 are associated with each other is inconsistent with a second presence area estimated based on a distance between the in-vehicle device 10 and the portable device 20, the control unit 320 performs control related to an operation of the controlled device mounted on the moving object V1 in accordance with the second presence area.

The exemplary configuration of the system 1 according to the embodiment has been described above. Next, technical features according to the embodiment will be described with reference to FIGS. 2 to 6.

2. Technical Features 2.1 Overview

Figure 2:
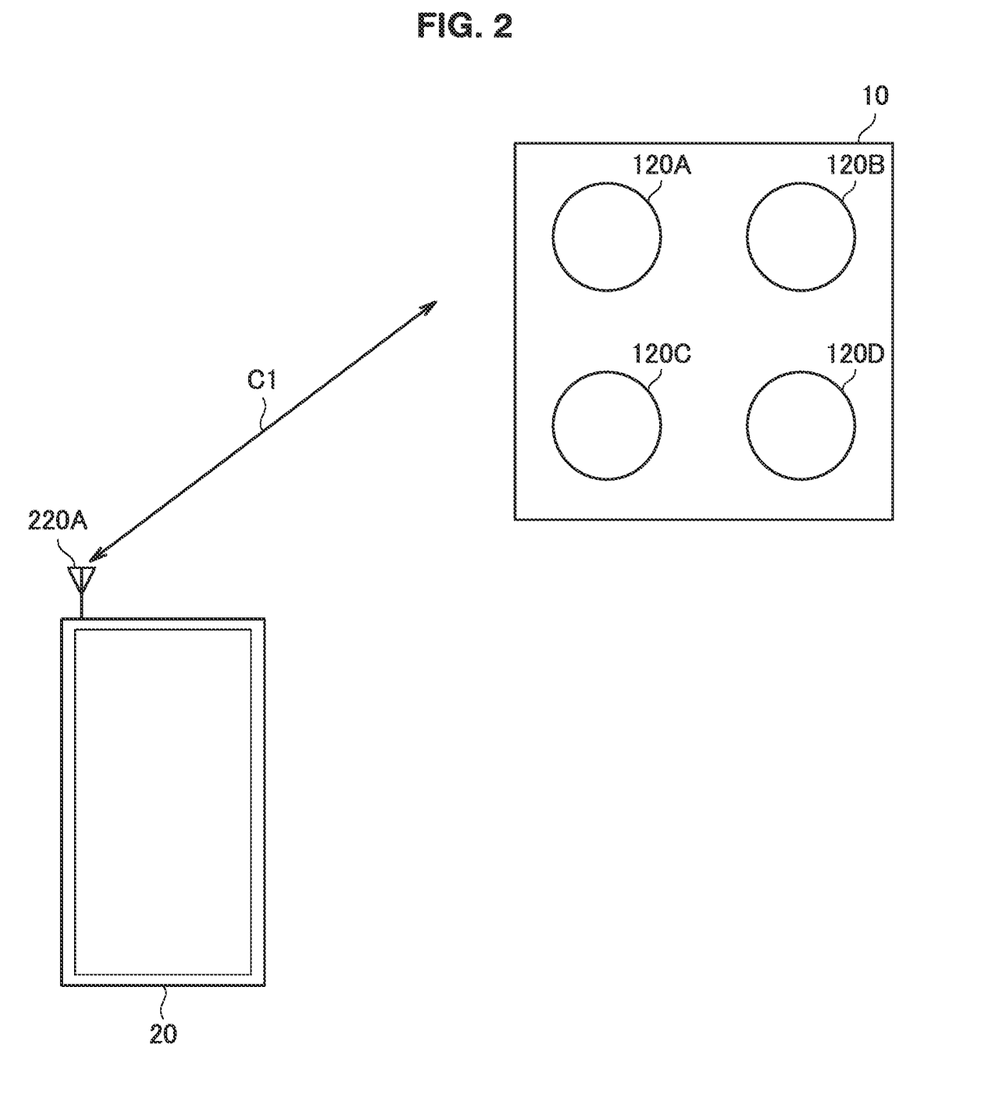
FIG. 2 is a diagram illustrating an overview of the system according to the embodiment.

FIG. 2 is a diagram illustrating an overview of the system 1 according to the embodiment. As illustrated in FIG. 2, the communication unit 120 of the in-vehicle device 10 includes, for example, antennas 120A, 120B, 120C, and 120D as a four-elements array antenna. The portable device 20 includes an antenna 220A as the communication unit 220. Here, the number of antennas included in the communication unit 120 of the in-vehicle device 10 and the communication unit 220 of the portable device 20 is not limited to this example. The number of antennas included in the communication unit 120 and the communication unit 220 may be singular or plural.

A scale ratio of the plurality of antennas included in the communication unit 120 and the in-vehicle device 10 is not limited to an illustrated scale ratio either. For example, the antennas 120A, 120B, 120C, and 120D may each be disposed at an interval of about ½ of a wavelength. A disposition shape of the four antennas may be a square, a parallelogram, a trapezoid, a rectangle, or any shape.

In FIG. 2, the antenna 220A included in the portable device 20 is disposed at the top left end of the portable device 20, but a disposition position of the antenna 220A included in the portable device 20 is not limited to this example. For example, the antenna 220A may be displayed at any position of the portable device 20.

As illustrated in FIG. 2, for example, the antenna 220A may transmit and receive a signal C1 to and from at least one of the plurality of antennas included in the communication unit 120.

The calculation unit 130 may estimate a positional relation between the in-vehicle device 10 and the portable device 20 based on the transmitted and received signal C1.

Hereinafter, an example of a flow of a process related to estimation of the positional relation between the in-vehicle device 10 and the portable device 20 according to the embodiment will be described.

2.2 Estimating Positional Relation (1) Estimating Distance

The calculation unit 130 performs a measurement process. The measurement process is a process of measuring a distance between the in-vehicle device 10 and the portable device 20. The measurement process includes a process of transmitting and receiving a measurement signal and estimating a distance between the in-vehicle device 10 and the portable device 20, that is, a measured value, based on the time taken to transmit and receive the measurement signal.

In the measurement process, a plurality of measurement signals can be transmitted and received between the in-vehicle device 10 and the portable device 20. A measurement signal transmitted from one device to the other device among the plurality of measurement signals is expressed as a Poll signal. A measurement signal transmitted as a reply to a Poll signal from a device receiving the Poll signal to a device transmitting the Poll signal is expressed as Resp signal. A measurement signal transmitted as a reply to a Resp signal from a device receiving the Resp signal to a device transmitting the Resp signal is expressed as a Final signal. The in-vehicle device 10 and the portable device 20 can transmit and receive any measurement signal. In the present specification, however, an example in which the portable device 20 transmits the Poll signal will be described.

(2) Estimating Arrival Angle

The calculation unit 130 estimates an arrival angle of a signal transmitted and received between the devices. In the present specification, the Final signal included in the measurement signal will be described as a signal for estimating an arrival angle.

Hereinafter, an example of a process related to estimation of a distance and estimation of an arrival angle will be described with reference to FIG. 3.

Figure 3:
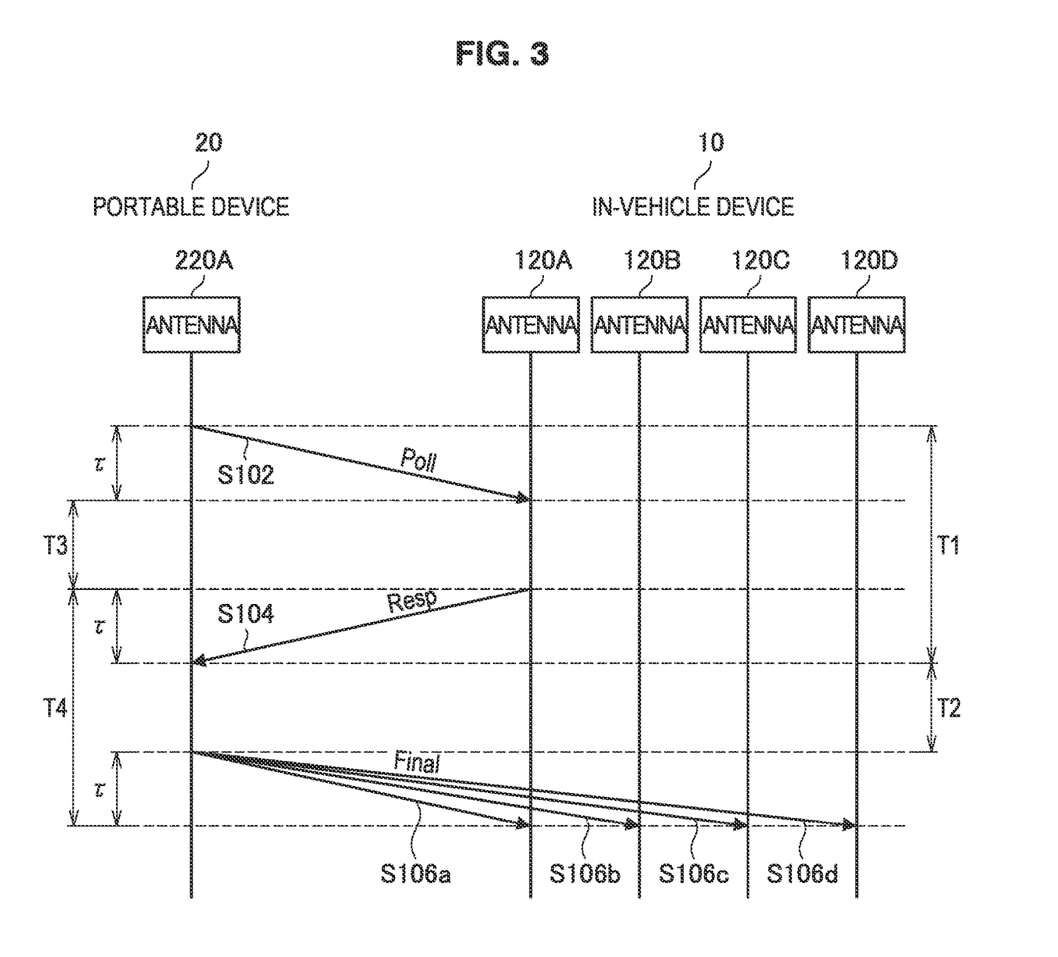
FIG. 3 is a sequence diagram illustrating an example of a process related to inter-device positional relation estimation performed in the system 1 according to the embodiment.

FIG. 3 is a sequence diagram illustrating an example of a process related to inter-device positional relation estimation performed in the system 1 according to the embodiment.

First, the antenna 220A included in the portable device 20 transmits a Poll signal to the antenna 120A included in the in-vehicle device 10 (S102).

Subsequently, the antenna 120A included in the in-vehicle device 10 transmits a Resp signal as a reply to the Poll signal to the antenna 220A included in the portable device 20 (S104).

Then, the antenna 220A included in the portable device 20 transmits a Final signal as a reply to the Resp signal to the antennas 120A, 120B, 120C, and 120D included in the in-vehicle device 10 (S106).

Here, for the portable device 20, a time length from transmission of the Poll signal to reception of the Resp signal is a time length T1 and a time length from reception of the Resp signal to transmission of the Final signal is a time length T2. For the in-vehicle device 10, a time length from reception of the Poll signal to transmission of the Resp signal is a time length T3 and a time length from transmission of the Resp signal to reception of the Final signal is a time length T4.

A distance between the in-vehicle device 10 and the portable device 20 may be calculated using each of the above-described time lengths. For example, the in-vehicle device 10 may receive a signal including information regarding the time lengths T1 and T2 from the portable device 20. Then, the calculation unit 130 calculates a propagation time τ of the signal using the time lengths T1, T2, T3, and T4. More specifically, the calculation unit 130 may calculate the propagation time τ of the signal using the following Expression 1.

$$\tau=(T1\times T4-T2\times T3)/(T1+T2+T3+T4) \quad \text{(Expression 1)}$$

The calculation unit 130 may multiply the calculated propagation time t of the signal by a known speed of a signal and estimate a distance between the in-vehicle device 10 and the portable device 20.

The example in which the calculation unit 130 estimates the distance between the in-vehicle device 10 and the portable device 20 based on the signals transmitted and received between the antenna 120A included in the in-vehicle device 10 and the antenna 220A included in the portable device 20 has been described. However, the signals may be transmitted and received using the antennas different from the antenna 120A included in the in-vehicle device 10 or the signals may be transmitted and received using the plurality of antennas.

The propagation time t of the signal is not limited to the calculation method using Expression 1. For example, the propagation time of the signal may be calculated by subtracting the time length T3 from the time length T1 and dividing that time by 2.

Subsequently, the arrival angle of the signal may be calculated from a phase difference of the Final signal received by the adjacent antennas among the plurality of antennas included in the in-vehicle device 10. For example, it is assumed that a phase of the Final signal received by the antenna 120A is a phase $P_A$, a phase of the Final signal received by the antenna 120B is a phase $P_B$, a phase of the Final signal received by the antenna 120C is a phase $P_C$, and a phase of the Final signal received by the antenna 120D is a phase $P_D$.

For example, a coordinate system in which a straight line connecting the antenna 120A to the antenna 120B is the x axis, a straight line connecting the antenna 120A orthogonal to the x axis to the antenna 120C is the y axis, and a perpendicular direction of the antenna 120A is the z axis is defined.

In the case of this coordinate system, phase differences $Pd_{AB}$ and $Pd_{CD}$ between the antennas adjacent in the X axis direction and phase differences $Pd_{AC}$ and $Pd_{BD}$ between the antennas adjacent in the Y axis direction are expressed using the following Expression 2.

$$Pd_{AB}=(P_B-P_A)$$
$$Pd_{CD}=(P_D-P_C)$$
$$Pd_{AC}=(P_C-P_A)$$
$$Pd_{BD}=(P_D-P_B) \quad \text{(Expression 2)}$$

Here, an angle formed between a straight line connecting the antennas 120A and 120B (or the antennas 120C and 120D) and a first incoming wave is referred to as a formed angle θ. An angle formed between a straight line connecting the antennas 120A and 120C (or the antennas 120B and 120D) and the first incoming wave is referred to as a formed angle Φ. Here, the formed angle θ and the formed angle Φ are expressed as in Expression 3. λ is a wavelength of a radio wave and d is a distance between the antennas.

$$\theta \text{ or } \Phi = \text{arc } \cos(\lambda \times Pd/(2\pi d)) \quad \text{(Expression 3)}$$

Accordingly, the calculation unit 130 calculates an arrival angle of a signal with Expression 4 based on Expressions 2 and 3.

$$\theta_{AB}=\text{arc } \cos(\lambda \times (P_B-P_A)/(2\pi d))$$
$$\theta_{CD}=\text{arc } \cos(\lambda \times (P_D-P_C)/(2\pi d))$$
$$\phi_{AC}=\text{arc } \cos(\lambda \times (P_C-P_A)/(2\pi d))$$
$$\phi_{BD}=\text{arc } \cos(\lambda \times (P_D-P_B)/(2\pi d)) \quad \text{(Expression 4)}$$

The calculation unit 130 may calculate an average value of $\theta_{AB}$ and $\theta_{CD}$ as the formed angle θ and may estimate one of $\theta_{AB}$ and $\theta_{CD}$ as the formed angle θ. Similarly, the calculation unit 130 may calculate an average value of $\phi_{AC}$ and $\phi_{BD}$ as the formed angle φ and may estimate one of $\phi_{AC}$ and $\phi_{BD}$ as the formed angle φ.

The calculation unit 130 may estimate a 3-dimensional position of the portable device 20 using the estimated distance and the formed angle θ or the formed angle φ.

For example, in the above-described coordinate system, the calculation unit 130 may estimate the 3-dimensional position of the portable device 20 using Expression 5.

$$x = R \times \cos \theta$$
$$y = R \times \cos \phi$$
$$z = \sqrt{(R^2 - x^2 - y^2)} \quad \text{(Expression 5)}$$

The definition of the above-described coordinate system is an example given to describe a method of estimating a 3-dimensional position of the portable device 20, and any coordinate system may be used.

A 3-dimensional position of the portable device 20 is an example of a coordinate position of the first communication device according to the present invention, but a coordinate position of the first communication device according to the present invention may be, for example, a 2-dimensional position of the portable device 20. In the present specification, a 3-dimensional position of the portable device 20 will be described as a coordinate position of the first communication device.

The calculation unit 130 may determine a presence area of the portable device 20 based on a 3-dimensional position of the portable device 20.

The presence area according to the embodiment may include, for example, a vehicle interior entry indicating that the portable device 20 is inside the vehicle, as an example of an indoor operation area. The presence area according to the embodiment may include a vehicle exterior entry indicating that the portable device 20 is in an area which is outside of the vehicle and where entry is allowed, as an example of an outdoor operation area. Further, the presence area according to the embodiment may include a vehicle exterior non-operation area indicating that the portable device 20 is in an area which is outside of the vehicle and where entry is not allowed, as an example of an outdoor non-operation area. "Entry" in the present specification can also refer to a state in which the control unit 320 can perform control related to a predetermined operation on a controlled device mounted in the moving object V1.

The vehicle exterior entry may include a driver (D) entry indicating that the portable device 20 is near the door of the driver seat of the vehicle, a passenger (P) entry indicating that the portable device 20 is near the door of the passenger seat, and a backdoor (BD) entry indicating the portable device 20 is near a backdoor.

For example, when a determination result is a vehicle interior entry, the control unit 320 may perform control related to starting or stopping on an engine included in the moving object V1. When a determination result is a vehicle exterior entry, the control unit 320 may perform control related to unlocking or locking of a door of the vehicle.

When a determination result is a D entry, a P entry, or a BD entry, the control unit 320 may perform control related to unlocking or locking of at least one of the doors including a door associated with each entry.

As described above, the calculation unit 130 can estimate a positional relation between the in-vehicle device 10 and the portable device 20 based on signals transmitted and receive between the plurality of antennas included in the in-vehicle device 10 and the antenna 220A of the portable device 20.

On the other hand, depending on a multi-path environment generated between the plurality of antennas included in the in-vehicle device 10 and the antenna 220A of the portable device 20, there is a possibility of estimation accuracy of the positional relation deteriorating. Hereinafter, the multi-path environment will be described.

2.3. Multi-Path Environment

In a process based on signals transmitted and received between the in-vehicle device 10 and the portable device 20, there is a possibility of estimation accuracy of the positional relation deteriorating depending on a radio wave propagation environment.

As an example of such a situation, a case in which an object such as a pillar is within a communication path from the communication unit 120 to the communication unit 220 can be exemplified. In this case, for example, there is a possibility of reception power of transmitted and received signals being reduced. Accordingly, the estimation accuracy of the positional relation can deteriorate.

As another example of such a situation, a case in which multi-paths occur can be exemplified. Multi paths indicate a state in which radio waves transmitted from a certain transmitter (for example, the portable device 20) arrive at a receiver (for example, the in-vehicle device 10) a plurality of times, and occur when there are a plurality of paths of radio waves between the transmitter and the receiver. Under a situation in which the multi-paths occur, there is a possibility of the estimation accuracy of the positional relation deteriorating due to mutual interference of radio waves passing through a plurality of different paths.

Accordingly, the calculation unit 130 is likely to determine a presence area of the portable device 20 based on the positional relation including an estimation error caused due to a multi-path environment.

For the estimation error of the positional relation caused due to the multi-path environment, an estimation error of a measured value can be reduced when the measured value is compared to an arrival angle.

That is, when the first presence area of the portable device 20 determined based on the 3-dimensional position of the portable device 20 is compared to the second presence area of the portable device 20 determined based on the measured value of the portable device 20, the second presence area can indicate an area where there is the portable device 20 with higher accuracy.

Accordingly, the control unit 320 of the control device 30 according to the embodiment performs control related to an operation of a controlled device in accordance with the second presence area when the first presence area estimated based on a coordinate position of the portable device 20 on an arbitrary coordinate system associating the in-vehicle device 10 with the portable device 20 is inconsistent with the second presence area estimated based on a distance between the in-vehicle device 10 and the portable device 20. Thus, the control unit 320 can perform control based on the presence area of the portable device 20 with higher accuracy.

The control unit 320 according to the embodiment may not perform control related to a predetermined operation of a controlled device when the first presence area estimated based on the coordinate position of the portable device 20 on an arbitrary coordinate system associating the in-vehicle device 10 with the portable device 20 is inconsistent with the second presence area estimated based on the distance between the in-vehicle device 10 and the portable device 20.

The fact that the control related to the predetermined operation of the controlled device is not performed indicates that, for example, an operation such as the above-described starting or stopping of the engine is not performed. In this case, the control unit 320 may end a control process according to the embodiment or may control transmission and reception of signals between the in-vehicle device 10 and the portable device 20 again. Thus, the control unit 320 can perform control based on the presence area of the portable device 20 with higher accuracy.

In the following specification, examples in which the control unit 320 performs control related to an operation of a controlled device in accordance with the second presence area when the first presence area is inconsistent with the second presence area will be mainly described.

Here, specific examples of control based on a presence area estimated based on a distance between the in-vehicle device 10 and the portable device 20 will be described with reference to FIGS. 4 and 5.

2.4. Specific Example of Control Based on Presence Area

Figure 4:
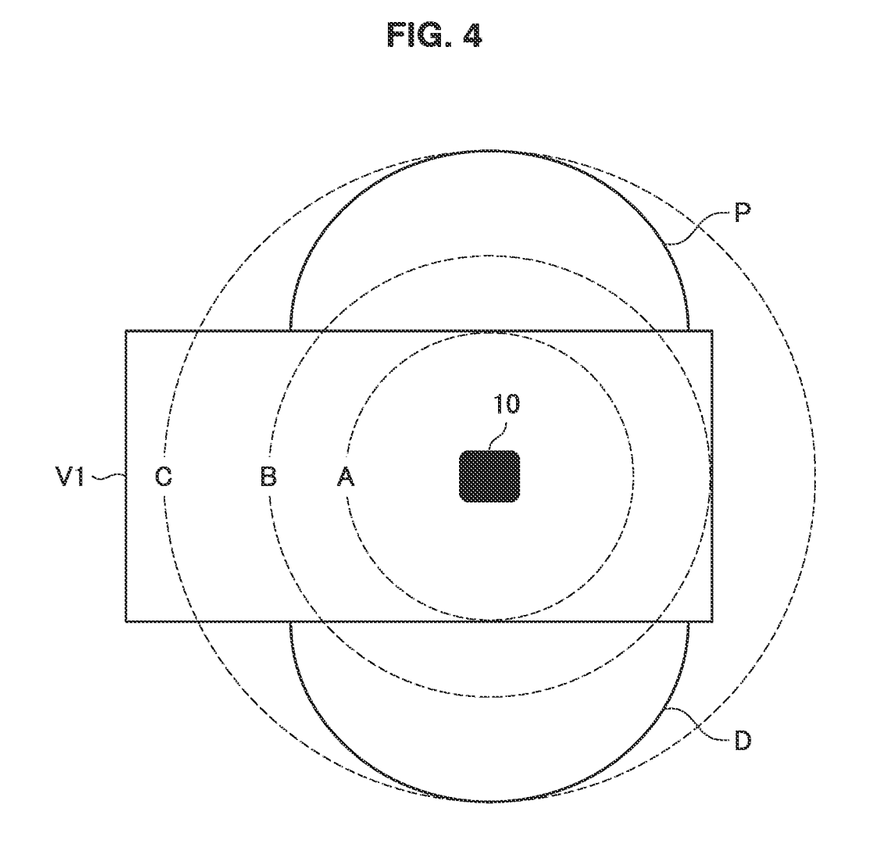
FIG. 4 is a diagram illustrating an example of control based on a second presence area estimated on the basis of a distance between an in-vehicle device 10 and a portable device 20 when one in-vehicle device 10 is mounted in a moving object V1.

FIG. 4 is a diagram illustrating an example of control based on a second presence area estimated on the basis of a distance between the in-vehicle device 10 and the portable device 20 when one in-vehicle device 10 is mounted in the moving object V1.

When one in-vehicle device 1 is mounted in the moving object V1, the calculation unit 130 may determine the second presence area based on the measured value r estimated by the calculation unit 130 and the plurality of areas preset centering on the in-vehicle device 10.

For example, a maximum value of the distance between the in-vehicle device 10 and the portable device 20 at which the portable device 20 is included inside the interior of the moving object V1 is assumed to be a distance A. A maximum value of a distance between the in-vehicle device 10 and the portable device 20 at which the portable device 20 is included in one of the vehicle interior of the moving object V1, the P entry, and the D entry is assumed to be a distance B. A maximum value of a distance between the in-vehicle device 10 and the portable device 20 at which the portable device 20 may be located in any of the vehicle interior of the moving object V1, the P entry, and the D entry, and a vehicle exterior non-operation area is assumed to be a distance C.

In this case, for example, a plurality of preset areas may include at least one area among an area less than the distance A, an area equal to or greater than the distance A and less than the distance B, an area equal to or greater than the distance B and less than the distance C, and an area equal to or greater than the distance C.

(Measured Value r<Distance A)

First, when the measured value r estimated by the calculation unit 130 is included in the area less than the distance A, the calculation unit 130 may determine that a presence area of the portable device 20 serving as the second presence area is the vehicle interior entry.

For example, when the first presence area determined based on a 3-dimensional position of the portable device 20 is the vehicle interior entry, the control unit 320 may consider that the first presence area is not inconsistent with the second presence area and may perform the control related to the operation of the controlled device in accordance with the first presence area.

Conversely, when the first presence area is an area different from the vehicle interior entry, the control unit 320 considers that the first presence area is inconsistent with the second presence area and performs the control related to the operation of the controlled device in accordance with the vehicle interior entry which is the second presence area.

Distance A≤Measured Value r<Distance B

Next, when the measured value r estimated by the calculation unit 130 is included in the area equal to or greater than the distance A and less than the distance B, the calculation unit 130 may determine that a presence area of the portable device 20 serving as the second presence area is the vehicle interior entry or the vehicle exterior entry.

For example, when the first presence area is the vehicle interior entry, the D entry, or the P entry, the control unit 320 may consider that the first presence area is not inconsistent with the second presence area and may perform the control related to the operation of the controlled device in accordance with the first presence area.

Conversely, when the first presence area is the vehicle exterior non-operation area, the control unit 320 considers that the first presence area is inconsistent with the second presence area and performs the control related to the operation of the controlled device in accordance with the second presence area.

Distance B≤Measured Value r<Distance C

Next, when the measured value r estimated by the calculation unit 130 is included in the area equal to or greater than the distance B and less than the distance C, the calculation unit 130 may determine that a presence area of the portable device 20 serving as the second presence area is one of the vehicle interior entry, the vehicle exterior entry, and the vehicle exterior non-operation area.

For example, when the first presence area is the vehicle interior entry, the D entry, the P entry, or the vehicle exterior non-operation area, the control unit 320 may consider that the first presence area is not inconsistent with the second presence area and may perform the control related to the operation of the controlled device in accordance with the first presence area.

Distance C≤Measured Value r

Next, when the measured value r estimated by the calculation unit 130 is included in the area equal to or greater than the distance C, the calculation unit 130 may determine that a presence area of the portable device 20 serving as the second presence area is the vehicle exterior non-operation area.

For example, when the first presence area is the vehicle exterior non-operation area, the control unit 320 may consider that the first presence area is not inconsistent with the second presence area and may perform the control related to the operation of the controlled device in accordance with the first presence area.

Conversely, when the first presence area is an area different from the vehicle exterior non-operation area, the control unit 320 may consider that the first presence area is inconsistent with the second presence area and may perform the control related to the operation of the controlled device in accordance with the second presence area.

The distances A, B, and C have been defined as the plurality of preset areas, but the present invention is not limited to these examples. For example, when it is desired to determine that the D entry is a presence area of the portable device 20 with high accuracy, the in-vehicle device 10 may be mounted at a position near the driver seat of the moving object V1. Thus, the calculation unit 130 can determine the D entry or an area which is not the D entry as the second presence area determined based on a measured value. That is, various presence areas can be preset in accordance with the position at which the in-vehicle device 10 is mounted in the moving object V1.

The control based on the second presence area estimated based on the distance between the in-vehicle device 10 and the portable device 20 when one in-vehicle device 10 is mounted in the moving object V1 has been described above. Next, an example of control based on the second presence area estimated on the basis of a distance between the in-vehicle device 10 and the portable device 20 when two in-vehicle device 10 are mounted in the moving object V1 will be described with reference to FIG. 5.

Figure 5:
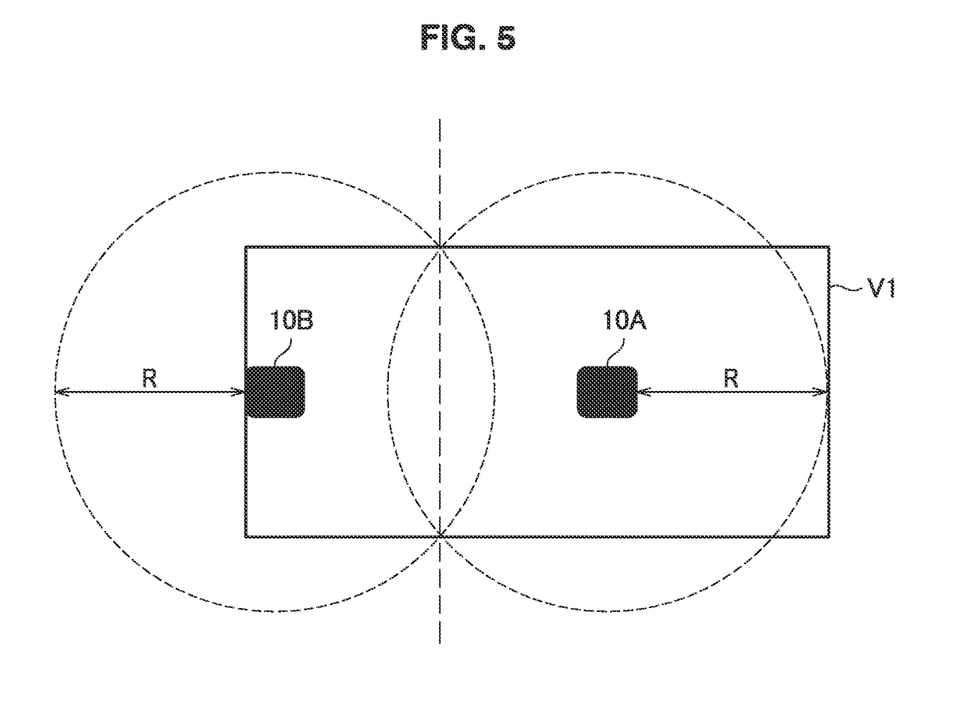
FIG. 5 is a diagram illustrating an example of control based on a second presence area estimated on the basis of distances between the in-vehicle devices 10 and the portable device 20 when two in-vehicle devices 10 are mounted in the moving object V1.

FIG. 5 is a diagram illustrating an example of control based on a second presence area estimated on the basis of distances between the in-vehicle devices 10 and the portable device 20 when two in-vehicle devices 10 are mounted in a moving object V1.

As illustrated in FIG. 5, two in-vehicle devices mounted in the moving object V1 are expressed as in-vehicle devices 10A and 10B. In FIG. 5, the in-vehicle device 10A is mounted in a front portion of the moving object V1 and the in-vehicle device 10B is mounted in a rearmost portion of the moving object V1 in the following description, but the position at which the in-vehicle devices 10 according to the embodiment are mounted may be disposed at any positions.

In the following description, it is assumed that a measured value estimated by the in-vehicle device 10A is a measured value r1 and a measured value estimated by the in-vehicle device 10B is a measured value r2.

In FIG. 5, radii R of circles centering on the in-vehicle devices 10A and 10B are the same as a distance from the central position of the in-vehicle device 10A to the foremost of the moving object V1. Here, the definition of the radii R is an example given to describe a method of determining the second presence area when two in-vehicle devices 10 are mounted in the moving object V1, and the present invention of the embodiment is not limited to this example.

Hereinafter, similarly to the description when two in-vehicle devices 10 are mounted in the moving object V1, a method of determining the second presence area will be described. However, since description related to control after it is determined whether the first presence area is inconsistent with the second presence area overlaps the description when one in-vehicle device 10 is mounted in the moving object V1, description thereof will be omitted sometimes.

Measured Value r1<R and Measured Value r2<R

First, when the measured value r1 is less than the radius R and the measured value r2 is less than the radius R, the calculation unit 130 may determine that a presence area of the portable device 20 serving as the second presence area is the vehicle interior entry.

Measured Value r1>Measured Value r2

Next, when the measured value r1 is greater than the measured value r2, the calculation unit 130 may determine that the area is located on a rear side of a central position of the position at which the in-vehicle device 10A is mounted and the position at which the in-vehicle device 10B is mounted. The area on the rear side includes, for example, the BD entry and the vehicle exterior non-operation area.

Measured Value r1<Measured Value r2

Next, when the measured value r1 is less than the measured value r2, the calculation unit 130 may determine that the area is located on a front side of the central position of the position at which the in-vehicle device 10A is mounted and the position at which the in-vehicle device 10B is mounted. The area on the front side includes, for example, the D entry, the P entry, and the vehicle exterior non-operation area.

The calculation unit 130 may calculate a positional parameter using the measured values r1 and r2. For example, the calculation unit 130 can calculate a sum, a difference, or a ratio of the measured values r1 and r2 as a positional parameter. The calculation unit 130 may determine the second presence area of the portable device 20 based on the positional parameter.

Next, an example of a method of determining the first presence area based on a coordinate position of the portable device 20 when two in-vehicle devices 10 are mounted in the moving object V1 will be described with reference to FIG. 6.

Figure 6:
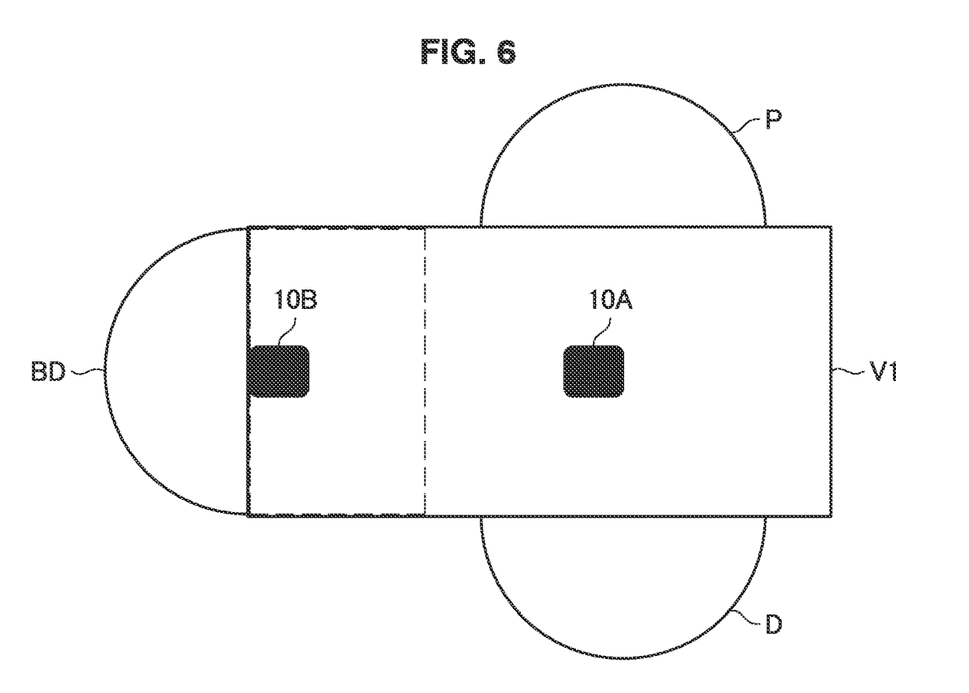
FIG. 6 is a diagram illustrating an example of a method of determining a first presence area when two in-vehicle devices 10 are mounted in the moving object V1.

FIG. 6 is a diagram illustrating an example of a method of determining the first presence area when two in-vehicle devices 10 are mounted in the moving object V1.

For example, as described above, the calculation unit 130 included in the in-vehicle device 10A and the calculation unit 130 included in the in-vehicle device 10B estimate a 3-dimensional position of the portable device 20. Of them, based on a 3-dimensional position of the portable device 20 estimated by the calculation unit 130 of one of the in-vehicle devices 10A and 10B, the calculation unit 130 may determine the first presence area.

Based on a 3-dimensional position of the portable device 20 estimated by the calculation unit 130 of each of the in-vehicle devices 10A and 10B, the calculation unit 130 may determine the first presence area. For example, an average value of 3-dimensional positions of the portable device 20 on the same coordinate system may be determined as the first presence area.

The examples in which the calculation unit 130 determines each of the vehicle interior entry, the D entry, the P entry, and the vehicle exterior non-operation area based on the 3-dimensional position of the portable device 20 have been described. However, for example, the first presence area may be determined based on a 2-dimensional position of the portable device 20.

The determination methods when one in-vehicle device 10 or two in-vehicle devices 10 are mounted in the moving object V1 have been described, but three or more in-vehicle devices 10 may be mounted in the moving object V1. Thus, the calculation unit 130 can determine the presence area of the portable device 20 with higher accuracy.

The technical features according to the embodiment will be described above. Next, an operation process of the system 1 according to the embodiment will be described.

3. Exemplary Operation Process

Figure 7:
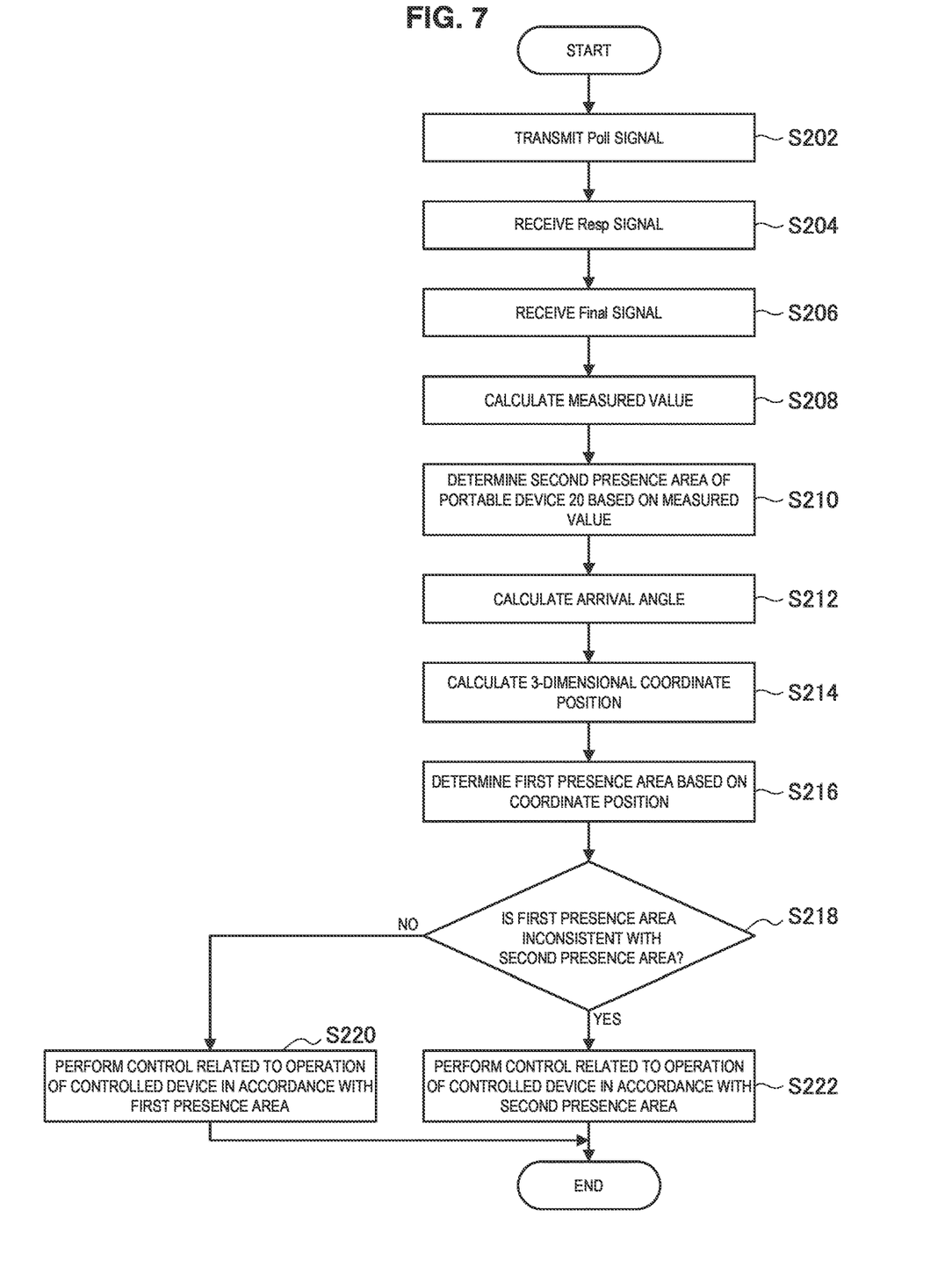
FIG. 7 is a diagram illustrating an example of an operation process related to the system 1 according to the embodiment.

FIG. 7 is a diagram illustrating an example of an operation process related to the system 1 according to the embodiment.

First, the antenna 220A included in the portable device 20 transmits the Poll signal to the antenna 120A included in the in-vehicle device 10 (S202).

Subsequently, the antenna 220A included in the portable device 20 receives the Resp signal transmitted from the antenna 120A included in the in-vehicle device 10 as a reply to the Poll signal (S204).

Subsequently, the antenna 220A included in the portable device 20 transmits the Final signal as a reply to the Resp signal to the plurality of antennas included in the in-vehicle device 10 (S206).

Then, the calculation unit 130 calculates a measured value which is a distance between the in-vehicle device 10 and the portable device 20 based on the signals transmitted and received between the antenna 120A included in the in-vehicle device 10 and the antenna 220A included in the portable device 20 (S208).

Then, the calculation unit 130 determines the second presence area of the portable device 20 based on the measured value estimated in S208 (S210).

Subsequently, the calculation unit 130 calculates an arrival angle of the signal based on the signals transmitted and received between the plurality of antennas included in the in-vehicle device 10 and the antenna 220A included in the portable device 20 (S212).

Subsequently, the calculation unit 130 estimates a 3-dimensional position of the portable device 20 based on the measured value calculated in S208 and the arrival angle of the signal calculated in S212 (S214).

Then, the calculation unit 130 estimates the first presence area of the portable device 20 based on the 3-dimensional position of the portable device 20 estimated in S214 (S216). Here, the communication unit 120 included in the in-vehicle device 10 transmits information regarding the first and second presence areas of the portable device 20 to the communication unit 310 included in the control device 30.

Then, the control unit 320 included in the control device 30 determines whether the first presence area is inconsistent with the second presence area (S218). When the first presence area is not inconsistent with the second presence area, the process proceeds to S220 (No in S218). When the first presence area is inconsistent with the second presence area, the process proceeds to S222 (Yes in S218).

When the first presence area is not inconsistent with the second presence area (No in S218), the control unit 320 performs the control related to the operation of the controlled device in accordance with the first presence area of the portable device 20 and the control device 30 ends the process.

When the first presence area is inconsistent with the second presence area (Yes in S218), the control unit 320 performs the control related to the operation of the controlled device in accordance with the second presence area of the portable device 20 and the control device 30 ends the process.

When the first presence area is inconsistent with the second presence area (Yes in S218), as described above, the control unit 320 may end the process without performing the control related to the predetermined operation of the controlled device and may perform control such that signals are transmitted and received between the in-vehicle device 10 and the portable device 20 again.

Through the control according to the embodiment, an influence of a determination error caused due to multi-paths or the like can be reduced in a determination result of the presence area of the portable device 20. The control unit 320 can perform control based on the presence area of the portable device 20 with higher accuracy.

4. Supplement

The preferred embodiments of the present invention have been described in detail above with reference to the appended drawings, but present invention is not limited thereto. It should be understood by those skilled in the art that various changes and alterations may be made within the scope of the technical spirits described in the appended claims and the various changes and alternations, of course, pertain to the technical scope of the present invention.

For example, the series of processes performed by the devices described in the present invention may be implemented using any of software, hardware, and a combination of software and hardware. A program of the software is stored in advance, for example, a recording medium (non-transitory medium) provided inside or outside of each device. For example, each program is read to a RAM at the time of execution in a computer and is executed by a processor such as a CPU. Examples of the recording medium include a magnetic disk, an optical disc, a magneto-optical disc, and a flash memory. The computer program may be delivered via a network, for example, without using a recording medium.

The processes described with reference to the sequence diagrams in the present specification may not necessarily be performed in the order described in the drawing. For example, some of the processing steps may be performed in parallel. Additional processing steps may be adopted and some of the processing steps may be omitted.

What is claimed is:

1. A control device comprising:
a control unit configured to perform control based on a presence area of a first communication device determined using a signal transmitted and received between the first communication device and at least one second communication device,
wherein the presence area includes a first presence area and a second presence area with a smaller estimation error due to multi-path compared to the first presence area, and
wherein the control unit performs control related to an operation of a controlled device in accordance with the second presence area when the first presence area is inconsistent with the second presence area.

2. The control device according to claim 1, wherein a coordinate position of the first communication device is estimated based on an arrival angle of the signal transmitted and received between the first and second communication devices and a distance between the first and second communication devices.

3. The control device according to claim 1, wherein a distance between the first and second communication devices is estimated based on a propagation time of the signal transmitted and received between the first and second communication devices.

4. The control device according to claim 1, wherein the second communication device is mounted on a moving object.

5. The control device according to claim 4, wherein the first communication device is carried by a user using the moving object.

6. The control device according to claim 4,
wherein the presence area includes at least one area among an indoor operation area of the moving object, an outdoor operation area of the moving object, and an outdoor non-operation area of the moving object, and
wherein the control unit performs control related to a predetermined operation of the moving object when the second presence area is the indoor operation area of the moving object or the outdoor operation area of the moving object.

7. The control device according to claim 6,
wherein the outdoor operation area of the moving object includes at least one area among a vicinity of a door of a driver seat, the vicinity of a door of a passenger seat, and the vicinity of a backdoor included in the moving object, and
wherein the control unit performs control related to unlocking or locking of one door among the door of the driver seat, the door of the passenger seat, and the backdoor included in the moving object when the second presence area is the outdoor operation area of the moving object.

8. The control device according to claim 1, wherein the control unit performs control related to the operation of the controlled device in accordance with the second presence area when the first presence area determined based on a coordinate position of the first communication device in an arbitrary coordinate system associating the first communication device with a plurality of second communication devices is inconsistent with the second presence area determined based on a distance estimated based on signals transmitted and received between the first communication device and the plurality of second communication devices.

9. The control device according to claim 1, wherein the signal includes a wireless signal in conformity with ultra-wideband wireless communication.

10. A control device comprising:
a control unit configured to perform control based on a presence area of a first communication device determined using a signal transmitted and received between the first communication device and at least one second communication device,
wherein the presence area includes a first presence area and a second presence area with a smaller estimation error due to multi-path compared to the first presence area, and
wherein the control unit does not perform control related to a predetermined operation of a controlled device when the first presence area is inconsistent with the second presence area.

11. A computer-readable non-transitory storage medium that stores a program causing a computer to implement a control function of performing control based on a presence area of a first communication device determined using a signal transmitted and received between the first communication device and at least one second communication device,
wherein the presence area includes a first presence area and a second presence area with a smaller estimation error due to multi-path compared to the first presence area, and
wherein control related to an operation of a controlled device is performed in accordance with the second presence area when the first presence area is inconsistent with the second presence area.

* * * * *